United States Patent [19]
Lee

[11] 4,409,351
[45] Oct. 11, 1983

[54] COMPOSITIONS COMPRISING THERMOPLASTIC RESIN AND LONG CHAINED FATTY ACID

[75] Inventor: Garland G. Lee, Mt. Vernon, Ind.

[73] Assignee: General Electric Company, Mt. Vernon, Ind.

[21] Appl. No.: 273,589

[22] Filed: Jun. 15, 1981

[51] Int. Cl.$^3$ .................. C08K 5/09; C08L 69/00; C08L 91/06

[52] U.S. Cl. .................. 524/322; 524/560; 524/609; 524/611

[58] Field of Search .......... 525/5; 260/18 TN, 18 N, 260/18 R, 22 A, 23 AR, 23.7 M, 23.7 N, 23.7 R, 23 XA; 524/611, 322, 560, 609

[56] References Cited

U.S. PATENT DOCUMENTS

| | | | |
|---|---|---|---|
| 3,265,648 | 8/1966 | Boor et al. | 524/322 |
| 3,342,762 | 9/1967 | Crovatt | 525/5 |
| 3,355,404 | 11/1967 | Ruffing et al. | 525/5 |
| 3,402,135 | 9/1968 | Schwartz et al. | 524/322 |
| 3,403,118 | 9/1968 | Listner | 524/322 |
| 3,444,115 | 5/1969 | Needham et al. | 524/322 |
| 3,492,257 | 1/1970 | Meyer et al. | 524/322 |
| 3,493,537 | 2/1970 | Salyer et al. | 524/322 |
| 3,511,793 | 5/1970 | Ezell | 524/322 |
| 3,523,932 | 8/1970 | Aalbers et al. | 525/5 |
| 3,784,595 | 1/1974 | Schirmer et al. | |
| 3,836,499 | 9/1974 | Schirmer et al. | |
| 3,905,927 | 9/1975 | Anderson et al. | 524/322 |
| 3,951,903 | 4/1976 | Shaffer | 524/611 |
| 3,953,387 | 4/1976 | Wolgemuth et al. | 260/18 TN |
| 3,959,539 | 5/1976 | Waggoner | 525/5 |
| 4,010,128 | 3/1977 | Saggese et al. | 524/322 |
| 4,065,436 | 12/1977 | Adelmann et al. | |
| 4,077,939 | 3/1978 | Paparatto et al. | 524/322 |
| 4,097,435 | 6/1978 | Rawlings et al. | |
| 4,111,861 | 9/1978 | Godlewski | 260/18 TN |
| 4,131,575 | 12/1978 | Adelmann et al. | |
| 4,180,490 | 12/1979 | MacLean | 524/322 |
| 4,302,378 | 11/1981 | Lindner et al. | 525/5 |

FOREIGN PATENT DOCUMENTS 56045944 9/1979 Japan .

*Primary Examiner*—Ronald W. Griffin
*Attorney, Agent, or Firm*—Martin B. Barancik

[57] ABSTRACT

Long chained fatty acids as effective mold release agents in thermoplastic resins.

15 Claims, No Drawings ated carbonate polymers of this invention. Also employed in
COMPOSITIONS COMPRISING THERMOPLASTIC RESIN AND LONG CHAINED FATTY ACID

BACKGROUND OF THE INVENTION

Useful articles from various thermoplastic resins have been prepared from molds for many years. Injection molding provides a convenient way for preparing various articles from thermoplastic resins, particularly objects of a relatively intricate nature. In order to injection mold articles in an economic manner the mold resident cycle time should be kept to a minimum. This shorter cycle time provides a shorter resin heat period with consequently less thermal damage to the resin itself and/or less thermal promoted interaction between the resin and various additives present in the resin. In order to accomplish a release of the resin from the mold, various mold release agents have been found which provide for a release of the resin with lower ejection pressure. Such an agent should be chemically compatible with the resin as measured by the usual characteristics of the resin under normal conditions and heat treatments.

Of the thermoplastic resins which find a mold release agent useful from time to time one of the most sensitive to chemical interaction are the polycarbonates. The carbonate bond is susceptible to bond cleavage, for example hydrolysis from the usual sources. Therefore, the particular mold release agent in the past has been substantially neutral. A series of patents disclosing the use of carboxylic acid esters as mold release agents for polycarbonates have been recently issued; U.S. Pat. Nos. 4,065,436; 3,836,499; 4,131,575 and 3,784,595. A new class of mold release agents for thermoplastic resins in general and polycarbonates in particular has been discovered.

SUMMARY OF THE INVENTION

In accordance with the invention, there is a composition comprising a thermoplastic resin in admixture with an injection mold releasing effective amount of saturated or unsaturated normal fatty acid having from about fourteen (14) to about thirty-six (36) carbon atoms, inclusive.

Examples of various thermoplastic resins which are within the invention include polycarbonates, polyesters, polysulfones, polyethersulfones, polyamides, polysulfides, polyacrylates, polyurethanes, polyolefins, polyvinylhalides, acrylonitrile butadiene styrene, butadiene styrenes, methacrylate butadiene styrenes and the like and blends of the above with each other or a further thermoplastic resin. The preferred thermoplastic resin is an aromatic polycarbonate.

The effective use of a long chain acid is indeed surprising in view of the well known reactivity of the carbonate linkage to various acidic and basic substances.

Aromatic polycarbonates are prepared in the conventional manner by reacting a dihydric phenol with a carbonate precursor in an interfacial polymerization process. Typical of some of the dihydric phenols that may be employed in the practice of this invention are bisphenol-A, (2,2-bis(4-hydroxy-3-methylphenyl) propane, 4,4-bis(4-hydroxyphenyl) heptane, 2,2-(3,5,3',5'-tetrachloro-4,4'-dihydroxydiphenyl) propane, 2,2-(3,5,3',5'-tetrabromo-4,4'-dihydroxydiphenyl) propane, (3,3'-dichloro-4,4'-dihydroxydiphenyl) methane, bis 4-hydroxy phenyl sulfone and bis 4-hydroxy phenyl sulfide. Other dihydric phenols of the bisphenol type are also available and are disclosed in U.S. Pat. Nos. 2,999,835; 3,028,365 and 3,334,154. Bisphenol-A is preferred.

It is, of course, possible to employ two or more different dihydric phenols or a copolymer of a dihydric phenol with a glycol or with hydroxy or acid terminated polyester, or with a dibasic acid in the event a carbonate copolymer or interpolymer rather than a homopolymer is desired for use in the preparation of the aromatic carbonate polymers of this invention. Also employed in the practice of this invention may be blends of any of the above materials to provide the aromatic carbonate polymer.

The carbonate precursor may be either a carbonyl halide, a carbonate ester or a haloformate. The carbonyl halides which can be employed herein are carbonyl bromide, carbonyl chloride and mixtures thereof. Typical of the carbonate esters which may be employed herein are diphenyl carbonate, di-(halophenyl) carbonates such as di(chlorophenyl) carbonate, di-(bromophenyl) carbonate, di-(trichlorophenyl) carbonate, di-(tribromophenyl) carbonate, etc., di-(alkylphenyl) carbonate such as di(tolyl) carbonate, etec., di-(naphthyl) carbonate, di-(chloronaphthyl) carbonate, phenyl tolyl carbonate, chlorophenyl chloronaphthyl carbonate, etc., or mixtures thereof. The haloformates suitable for use herein include bis-haloformates of dihydric phenols (bis-chloroformates of hydroquinone), or glycols (bishaloformates of ethylene glycol, neopentyl glycol, polyethylene glycol, etc.). While other carbonate precursors will occur to those skilled in the art, carbonyl chloride, also known as phosgene, is preferred.

The polycarbonate polymers of this invention may be prepared by employing a molecular weight regulator, an acid acceptor and a catalyst. The molecular weight regulators which can be employed in carrying out the process of this invention include monohydric phenols such as phenol, chroman-I, paratertiarybutylphenol, parabromophenol, primary and secondary amines, etc. Preferably, phenol is employed as the molecular weight regulator.

A suitable acid acceptor may be either an organic or an inorganic acid acceptor. A suitable organic acid acceptor is a tertiary amine and includes such materials as pyridine, triethylamine, dimethylaniline, tributylamine, etc. The inorganic acid acceptor may be one which can be either a hydroxide, a carbonate, a bicarbonate, or a phosphate of an alkali or alkaline earth metal.

The catalysts which are employed herein can be any of the suitable catalysts that aid the polymerization of bisphenol-A with phosgene. Suitable catalysts include tertiary amines such as, for example, triethylamine, tripropylamine, N,N-dimethylaniline, quaternary ammonium compounds such as, for example, tetraethylammonium bromide, cetyl triethyl ammonium bromide, tetra-n-heptylammonium iodide, tetra-n-propyl ammonium bromide, tetramethylammonium chloride, tetramethyl ammonium hydroxide, tetra-n-butylammonium iodide, benzyltrimethylammonium chloride and quaternary phosphonium compounds such as, for example, n-butyltriphenyl phosphonium bromide and methyltriphenyl phosphonium bromide.

Also included herein are branched polymers wherein a polyfunctional aromatic compound is reacted with the dihydric phenol and carbonate precursor to provide a thermoplastic randomly branched polycarbonate polymer.

These polyfunctional aromatic compounds contain at least three functional groups which are carboxyl, carboxylic anhydric, haloformyl or mixtures thereof. Examples of these poly-functional aromatic compounds which may be employed in the practice of this invention include: trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic anhydride and the like. The preferred polyfunctional aromatic compounds are trimellitic anhydride or trimellitic acid, or their haloformyl derivatives.

Also, included herein are blends of a linear polymer and a branched polymer.

Within the definition of polycarbonate are also copolyester-carbonates, that is the polymer made from a dihydric phenol, a dibasic acid and a phosgene precursor. U.S. Pat. No. 3,169,121 covering copolyestercarbonates and methods of preparing them is hereby incorporated by reference.

The method of preparing the thermoplastic resins other than the aromatic polycarbonates are equally well known, consequently no detailed procedures of preparation are necessary.

The mold release agents of this invention are saturated and unsaturated normal fatty acids having from fourteen to thirty-six carbon atoms, inclusive. Examples of the saturated acids include myristic, palmitic, stearic, arachidic, behenic and hexatrieisocontanoic ($C_{36}$) acids). Examples of the unsaturated acids are palmitoleic, oleic, linolenic and cetoleic. Saturated acids are preferred. The most preferred acids are arachidic and behenic.

An effective mold releasing amount of the acid is employed in the thermoplastic composition. Any amount of acid which reduces the amount of pressure needed to eject the article from the injection mold and obtain an unblemished article in comparison to the pressure needed to eject the thermoplastic composition control (i.e., no acid) is an effective mold releasing amount. In general, effective amounts of the acid are from about 0.01 to about 3.0 weight percent, based on the quantity of thermoplastic resin present, preferably from about 0.05 to about 0.5 weight percent. The acid can be added to the resin in the normal manner that the other additives are added, for example, in the dry stage and coextruded or in a solvent and melt extruded with the resin.

Other additives in common use in the thermoplastic resins may also be employed. For example with respect to aromatic polycarbonate, additives which are commonly known to stabilize the resin thermally such as a phosphite can be employed. Hydrolytic stabilizers such as epoxides may also be employed as well as agents which are flame retardants, drip inhibitors, ductility enhancer, antioxidant, solvent resistance enhancer, ultraviolet light stabilizers and various inert fillers. Active fillers and pigments can be used with passivating agents and treatments.

Below are specific examples of the invention. The examples are intended to illustrate but not narrow the inventive concept. All percentages of the additives are in weight percent of the thermoplastic resin.

EXAMPLE 1

In all the ensuing examples the aromatic polycarbonate is Lexan®140, a polymer produced by reacting bisphenol-A and phosgene. The mold release agent was dry formulated into the polycarbonate at levels of 0.3 weight percent unless otherwise stated. Also present in the composition is 0.03 weight percent of a phosphite stabilizer.

EXAMPLE 2

In a 225 ton Battenfeld injection molding machine with a 4 ounce shot capacity, various mold release agents were tested. The mold used was a 3"×3" box with a 1½" wall height. It had ejector pins at four corners with two of the pins being attached to strain gauge transducers for measuring the part ejection pressure. The mold was designed with very little draft so that the part would tend to stick to the core unless mold release is used. To vary the amount of shrinkage on the core, the temperature of the stationary and moving mold halves could be varied.

The molding conditions employed were those below:

TABLE 1

| | |
|---|---|
| Clamp Conditions: | |
| Clamp Pressure psi/ton | 200 |
| Melt Conditions: | |
| Nozzle, °F. | 544 |
| Front Zone, °F. | 547 |
| Middle Zone, °F. | 541 |
| Back Zone, °F. | 510 |
| Melt Temperature (measured), °F. | 570 |
| Screw Conditions: | |
| RPM | 34 |
| Shot Size, inches | 1⅝ |
| Injection Conditions: | |
| Injection Pressure, psi | 14,000 |
| Injection Speed (A-1 to E-10; hand valve open) | A-9 |
| Injection Pressure Time, sec. | 3 |
| Cushion, inches | None |
| Injection Fill Time, sec. | 2 |
| Molding Conditions: | |
| Cure Time, sec. | 40 |
| Mold Temperature (Stationary), °F. | 165 |
| Mold Temperature (Moving), °F. | 115 |

Below are the values in pounds per square inch in arithmetic mean plus or minus two standard deviations.

TABLE II

| MOLD RELEASE AGENT/VENDOR | SHOTS EVALUATED | EJECTOR PIN PRESSURE PSI $\bar{x} \pm 2\delta$ | |
|---|---|---|---|
| | | #1 | #2 |
| PETS[1]/HERCULES | 10 | 5725 ± 184 | 5820 ± 206 |
| STEARYL STEARATE | 10 | 3860 ± 229 | 4230 ± 291 |
| $C_{36}$ DI BASIC ACID/HUMKO | | PINS PUNCHED THROUGH ON ELEVENTH SHOT | |

TABLE II-continued

| MOLD RELEASE AGENT/VENDOR | SHOTS EVALUATED | EJECTOR PIN PRESSURE PSI $\bar{x} \pm 2\delta$ #1 | #2 |
|---|---|---|---|
| N—OCTADECYLSTEARAMIDE | 10 | 5850 ± 105 | 6500 ± 141 |
| KEMESTER[2] 9022/HUMKO | 10 | 3135 ± 141 | 3495 ± 145 |
| KEMESTER METHYL-BEHENATE/HUMKO | 10 | 2525 ± 79 | 2930 ± 84 |
| MOBAY GRADE 6555[3] | 10 | 2225 ± 97 | 2530 ± 96 |
| BUTYL STEARATE/HUMKO | 10 | 2670 ± 93 | 2875 ± 150 |
| EMERY 2218 METHYL STEARATE/EMERY | 10 | 4205 ± 317 | 4590 ± 304 |
| HYSTRENE[4] 9022/HUMKO | 10 | 1785 ± 48 | 2020 ± 78 |

[1] Pentaerythritol tetrastearate
[2] $C_{20}/C_{22}$ methylester
[3] Commercial polycarbonate with about 0.33 stearyl behenate, according to analysis.
[4] $C_{20}/C_{22}$ fatty acid.

The values from the above table are significant. Polycarbonate having PETS, a commercially employed mold release agent ester requires a very high amount of pressure to effect release from the mold. Various other materials also require relatively high pressures to eject the article from the mold. Clearly the most effective mold release agent as measured by ejector pins pressure is the Hystrene 9022 composition. A sample of this composition has been analyzed and found to contain 62% behenic acid, 28.8% arachidic acid, 5.7% stearic acid, 1.3% palmitic acid and about 2% of unidentified material.

EXAMPLE 3

An intricate molded article was prepared using Lexan ® 140 with a 0.3 weight percent Hystrene 9022. The same article was prepared with Mobay 6555, a polycarbonate with about 0.3 weight percent of stearyl behenate as the mold release agent. The Hystrene 9022 was a much better mold release agent as shown by the fact that the dwell time in the mold could be reduced from 10 seconds to 8.5 seconds when the Hystrene 9022 was employed as the mold release agent as opposed to the stearyl behenate. This fifteen percent reduction of dwell time allows a significant savings in production time, maintenance, energy costs and related variables.

EXAMPLE 4

The Hystrene 9022 was tested in various ways for its basic compatibility with Lexan ® 140 resin. The mold release agents to which it is compared is PETS, a standard commercial mold release agent.

TABLE III

| | HYSTRENE 9022 | PETS |
|---|---|---|
| I. Kasha Index (KI) | | |
| a. 6 min | 2990 | 3330 |
| b. 15 min | 2850 | 3260 |
| II. Yellowness Index (YI) | 1.5 | 1.8 |
| III. % Transparency (% T) | 90 | 90 |
| IV. % Haze (% H) | 0.4 | 0.5 |
| V. RS Sunlamp | | |
| 24 m (YI) | 6.4 | 6.5 |
| VI. Oven Aging | | |
| 1 week (YI) | 6.3 | 4.0 |
| VII. High Temp. Molding | | |
| @ 570° F.: YI | 1.8 | 2.0 |
| % T | 90.1 | 89.6 |
| @ 620° F.: YI | 1.8 | 2.2 |
| % T | 90.0 | 80.6 |
| @ 680° F.: YI | 2.2 | 2.1 |
| % T | 89.9 | 89.6 |
| VIII. Autoclave @ 250° F. | | |
| a. initial: % T | 90.0 | 89.8 |
| b. after 24 hr: % T | 82.9 | 87.0 |
| c. after 51 hr: % T | 74.5 | 77.7 |

Tests I–VII used resin with 0.03 weight percent of a commercial phosphite stabilizer—Weston CDP1106, supplied by Borg Warner.

Test VIII used resin with 0.03 weight percent of a commercial hindered phosphite stabilizer B900 supplied by Ceba Geigy in the Hystrene 9022 sample and 0.1 weight percent of B900 in the PETS sample.

EXAMPLE 5

In a manner similar to Examples 2, 3 and 4, arachidic or behenic acid is added to a polyester, polysulfone, polyethersulfone, polyamide, polysulfide, polyacrylate, polyurethane, polyolefin, polyvinylhalide, acrylonitrile butadiene styrene, butadiene styrene or methacrylate butadiene styrene. Similar results are obtained.

EXAMPLE 6

In a manner similar to Examples 2, 3 and 4 myristic acid, palmitic acid, stearic acid and various other higher acids as well as palmitoleic, oleic, linolenic and cetoleic acids are added to any of the resins of Examples 2, 3 4 and 5. Similar mold release results are obtained.

What is claimed is:

1. A composition comprising a thermoplastic resin selected from the group consisting of aromatic polycarbonate, polysulfone, polyethersulfone, polysulfide or polyacrylate in admixture with an injection mold releasing effective amount of a saturated or unsaturated fatty acid having from about 14 to about 36 carbon atoms, inclusive.

2. A composition in accordance with claim 1 wherein the thermoplastic resin is a polysulfone, polyethersulfone, polysulfide or polyacrylate.

3. A composition in accordance with claim 2 wherein the fatty acid is saturated.

4. A composition in accordance with claim 3 wherein the saturated fatty acid is arachidic or behenic.

5. A composition in accordance with claim 1 wherein the thermoplastic resin is an aromatic polycarbonate.

6. A composition in accordance with claim 5 wherein the fatty acid is saturated.

7. A composition in accordance with claim 6 wherein the saturated fatty acid is arachidic or behenic.

8. A composition in accordance with claim 6 wherein the saturated fatty acid is hexatrieisocontanoic ($C_{36}$).

9. A composition in accordance with claims 3 or 6 wherein the saturated fatty acid is present in an amount of from about 0.01 to about 3 weight percent, based on the weight of thermoplastic resin.

10. A composition in accordance with claim 3 or 6 wherein the amount of saturated fatty acid is from about 0.05 to about 0.5 weight percent.

11. A composition in accordance with claim 7 wherein the amount of acid is from about 0.01 to about 3 weight percent.

12. A composition in accordance with claim 7 wherein the amount of acid is from about 0.05 to about 0.5 weight percent.

13. A composition in accordance with claim 7 wherein the amount of acid is from about 0.01 to about 0.05 weight percent.

14. A composition in accordance with claim 3 wherein the amount of acid is from about 0.01 to about 0.05 weight percent.

15. A composition in accordance with claim 6 wherein the amount of acid is from about 0.01 to about 0.05 weight percent.

* * * * *